(12) United States Patent
Ross et al.

(10) Patent No.: US 9,762,086 B1
(45) Date of Patent: Sep. 12, 2017

(54) SWITCHLESS POWER SOURCE REDUNDANCY

(75) Inventors: Peter G. Ross, Olympia, WA (US); Richard A. Stevens, Auburn, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 1063 days.

(21) Appl. No.: 12/979,973

(22) Filed: Dec. 28, 2010

(51) Int. Cl.
*H02J 9/06* (2006.01)
*H02J 1/10* (2006.01)

(52) U.S. Cl.
CPC ........... *H02J 9/06* (2013.01); *H02J 1/102* (2013.01); *H02J 1/108* (2013.01); *Y10T 307/707* (2015.04)

(58) Field of Classification Search
None
See application file for complete search history.

(56) References Cited

U.S. PATENT DOCUMENTS

| | | | | |
|---|---|---|---|---|
| 5,428,523 A * | 6/1995 | McDonnal | ......... | 363/71 |
| 5,818,125 A * | 10/1998 | Manchester | ......... | 307/66 |
| 6,104,103 A * | 8/2000 | Siewert et al. | ......... | 307/64 |
| 6,121,693 A * | 9/2000 | Rock | ......... | 307/18 |
| 6,175,217 B1 * | 1/2001 | Da Ponte et al. | ......... | 322/19 |
| 6,559,559 B2 * | 5/2003 | Cratty | ......... | 307/64 |
| 7,109,603 B2 * | 9/2006 | Wise et al. | ......... | 307/28 |
| 7,719,812 B2 * | 5/2010 | Phadke et al. | ......... | 361/93.1 |
| 8,546,977 B2 * | 10/2013 | Togare | ......... | 307/43 |
| 8,736,107 B1 * | 5/2014 | Frink et al. | ......... | 307/43 |
| 2005/0105229 A1 * | 5/2005 | Deng | ......... | H02J 9/062 361/90 |
| 2008/0088183 A1 * | 4/2008 | Eckroad | ......... | H02J 3/16 307/66 |
| 2009/0021078 A1 * | 1/2009 | Corhodzic et al. | ......... | 307/67 |
| 2009/0235093 A1 * | 9/2009 | Diab | ......... | G06F 1/30 713/300 |
| 2010/0080022 A1 * | 4/2010 | Schmidt | ......... | 363/53 |
| 2010/0332857 A1 * | 12/2010 | Vogman | ......... | 713/300 |
| 2011/0006600 A1 * | 1/2011 | Fontana et al. | ......... | 307/25 |

* cited by examiner

*Primary Examiner* — Rexford Barnie
*Assistant Examiner* — David Shiao
(74) *Attorney, Agent, or Firm* — Thomas | Horstemeyer LLP

(57) ABSTRACT

Disclosed are various embodiments of switchless power source redundancy in a power source transfer device providing power to one or more computing device(s). The power source transfer device includes a plurality of AC power converters configured to receive power from corresponding power sources. A first AC power converter provides DC power to a common DC bus of the power source transfer device. A second AC power converter provides DC power to the common DC bus in response to a change in a monitored level provided by the first AC power converter.

22 Claims, 3 Drawing Sheets

SWITCHLESS POWER SOURCE REDUNDANCY

BACKGROUND

In large scale computing centers, it is possible that thousands of servers may be running at a single time. Typically, servers include a single AC power input that may be mechanically switched between separate AC power sources to provide for power input redundancy. This ensures that if one of the AC power sources goes down, power to the servers can be quickly restored to continue operation. However, the expense and reliability of the switching device can make such a system undesirable.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

According to various embodiments, various systems and methods are employed to ensure power redundancy for computing devices. Commonly, various rack mounted computing devices such as those in server banks and the like each include a single AC power input that is connected to an AC power source through a mechanical automatic transfer switch (ATS). Ideally, the ATS switches from a primary power source to a secondary power source when the primary power source goes down. However, switching delays and transition effects may result in shutdown of the computing devices. Thus, replacing the expensive and somewhat unreliable ATS's may be advantageous. Various approaches are described herein to ensure that power is maintained to a computing device (e.g., a server) by a switchless transition between two or more power inputs. In the following discussion, a general description of the system and its components is provided, followed by a discussion of the operation of the same.

Figure 1:
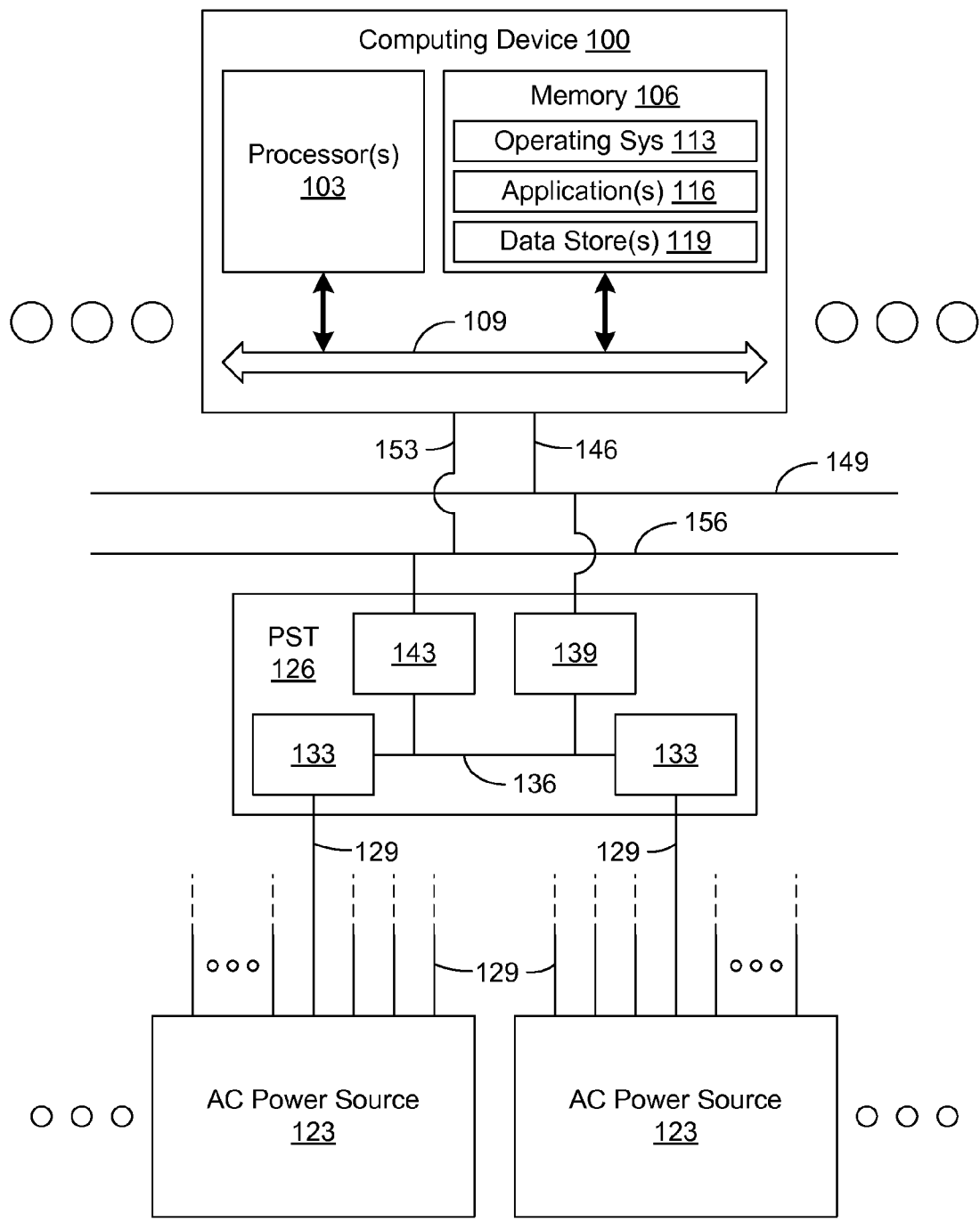
FIG. 1 is a drawing of one example of a power source transfer (PST) device with multiple power inputs according to various embodiments of the present disclosure.

With reference to FIG. 1, shown is a computing device 100 according to various embodiments. The computing device 100 may comprise, for example, a server or any other device providing computing capability. According to various embodiments, a plurality of computing devices 100 may be employed that are arranged, for example, in one or more server banks or computer banks or other arrangements. For example, a plurality of computing devices 100 together may comprise a cloud computing resource, a grid computing resource, and/or any other distributed computing arrangement. Such computing devices 100 may be located in a rack at a single installation or may be distributed among multiple racks at the same or different geographical locations. For purposes of convenience, the computing device 100 is referred to herein in the singular. Even though the computing device is referred to in the singular, it is understood that a plurality of computing devices 100 may be employed in the various arrangements, as described above.

The computing device 100 includes at least one processor circuit, for example, having a processor 103 and a memory 106, both of which are coupled to a local interface 109. To this end, the computing device 100 may comprise, for example, at least one server or like computing device. The local interface 109 may comprise, for example, a data bus with an accompanying address/control bus or other bus structure as can be appreciated. The computing device 100 may also include communication interfaces for interactions with other computing devices or management systems.

Stored in the memory 106 are both data and several components that are executable by the processor 103. In particular, stored in the memory 106 and executable by the processor 103 are an operating system 113 and various applications 116. The applications 116 generally comprise primary applications run on the computing device 100 to accomplish various purposes. In some embodiments, the memory 106 may also store one or more data stores 119 and other data.

The computing device 100 receives power for operation from a power source. In general, AC power is provided to the computing device by an AC power source 123 at a standard voltage (e.g., 208-240 VAC), where a power supply converts the AC power to DC power at one or more DC voltages utilized by the computing device 100. In other embodiments, the computing device 100 may be configured to receive DC power at a predefined voltage level (e.g., 400 VDC) that the power supply of the computing device then regulates to provide one or more DC voltages for use in the computing device 100. Computing devices 100 may be configured to receive AC power, DC power, or a combination of both AC and DC power for use.

To ensure power redundancy for the computing device(s) 100, the power is provided to the computing device(s) 100 through a power source transfer (PST) device 126. The PST device 126 includes two or more power inputs 129 that supply power from corresponding AC power sources 123 through a bus connection or other appropriate circuit connection. Each of the power inputs 129 may comprise, for example, a receptacle into which a power line such as a power cord is plugged, a quick disconnect blade-type or pin-type connection, or a hard wired connection. The power inputs 129 provide power to corresponding AC power converters 133, which are configured to convert AC power to DC power and to provide the DC power to a common DC bus or rail 136 in the PST device 126. For example, the AC power converters 133 may include a rectifier circuit to convert AC power to DC power. In some embodiments, a boost and/or a buck circuit may be used to adjust the DC voltage to a desired level. In one implementation, the AC power converters 133 are configured to convert 208-240 VAC power to DC power at a predefined voltage level (e.g., 400 VDC) and provide it to the common DC bus 136. The PST device 126 may also be configured to provide power factor correction. For example, active rectification (e.g., controlling the switching of the rectifier elements) may be used to adjust the power factor seen by the corresponding AC power source 123. Power factor correction can reduce reactive load effects and improve operation and capacity of the AC power source 123.

The PST device 126 may be configured to provide AC power, DC power, or a combination of both AC and DC power for use by the computing device(s) 100. The PST device 126 may include a DC power converter 139 and/or a DC power interface 143 to provide the appropriate power. The DC power converter 139 receives DC power from the common DC bus 136 and provides AC power to the computing device(s) 100 for operation. In some implementations, the output of the DC power converter 139 may provide AC power directly to the computing device 100 through a power input 146. In alternative implementations, the DC power converter 139 provides AC power through an AC distribution network 149, which supplies one or more computing device(s) through a power input 146. The AC distribution network 149 may be a network of rails or buses and connectors to interface with the power input 146. While a single DC power converter 139 is depicted, in other embodiments a plurality of DC power converters 139 may be utilized to supply power at one or more predefined voltage and/or frequency levels.

The DC power interface 143 provides DC power from the common DC bus 136 to the computing device(s) 100 for operation. In some implementations, the output of the DC power interface 143 may provide DC power directly to the computing device 100 through a power input 153. In alternative implementations, the DC power interface 143 provides DC power through a DC distribution network 156, which supplies one or more computing device(s) through the power input 153. The DC distribution network 156 may be a network of rails or buses and connectors to interface with the power input 153. In one embodiment, the DC power interface 143 is a direct connection that provides DC power directly from the common DC bus 136 to the DC distribution network 156 or a computing device 100. Filters may be included to the filter DC power to inhibit the propagation of harmonics from the common DC bus 136 to the computing device(s) 100 or from the DC distribution network 156 to the common DC bus 136. In other embodiments, the DC power interface 143 may include a voltage regulator or other appropriate control that adjusts the voltage of the common DC bus to provide the DC power at a predefined voltage level. While a single DC power interface 143 is depicted, in other embodiments a plurality of DC power interfaces 143 may be utilized to supply power at one or more predefined voltage levels.

Each of the power inputs 146 and/or 153 may comprise, for example, a receptacle into which a power line such as a power cord is plugged. In some embodiments, the power input 146 and/or 153 may represent a quick disconnect blade-type or pin-type connection such as within a mounting rack that, when the computing device 100 is inserted into the rack, connects the computing device 100 to the AC and/or DC distribution networks 149 and 156. Alternatively, the power input 146 and/or 153 may be hard wired to the AC and/or DC distribution networks 149 and 156 or to the PST device 126.

Figure 2:
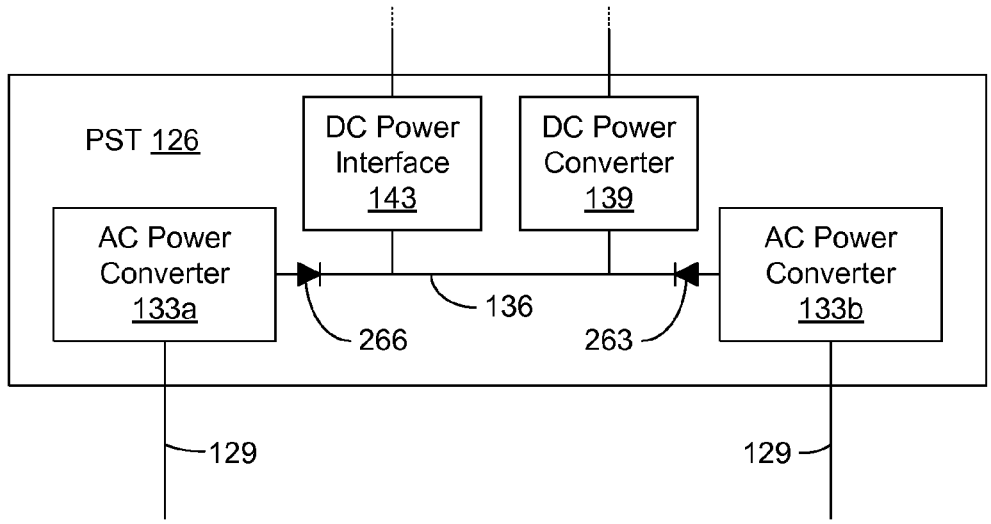
FIG. 2 is a drawing of an example of a PST device of FIG. 1 according to various embodiments of the present disclosure.
Figure 3:
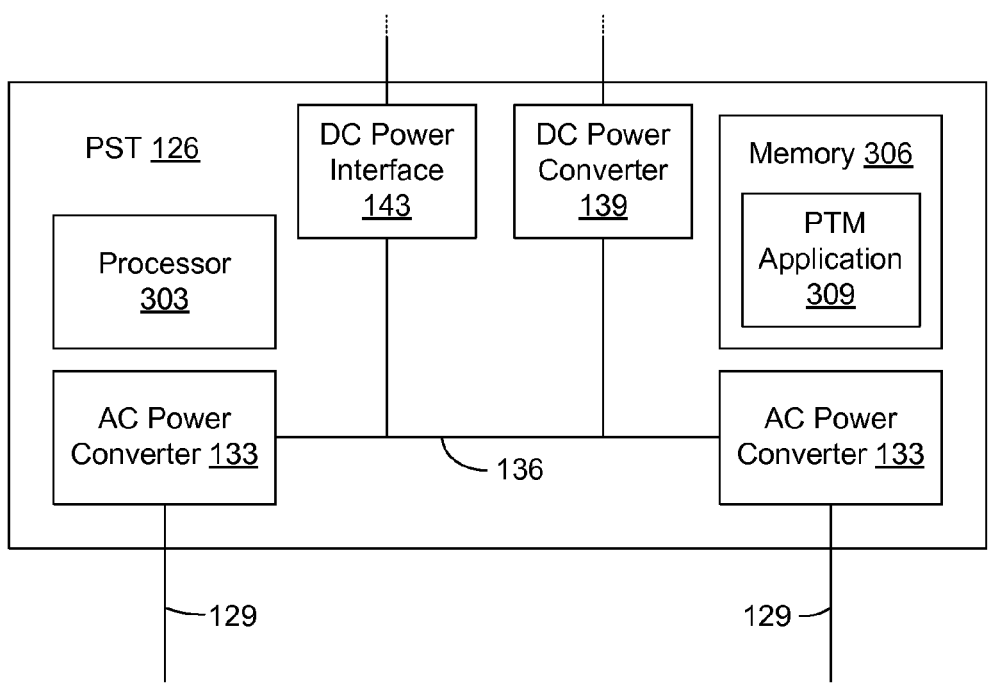
FIG. 3 is a drawing of another example of a PST device of FIG. 1 according to various embodiments of the present disclosure.

For purposes of illustration, FIGS. 1-3 show various embodiments of the PST device 126 having two power inputs 129. However, where two power inputs 129 to a respective PST device 126 are shown and discussed herein, the recitation of two power inputs 129 to corresponding AC power converters 133 as such is merely representative of the fact that more than two power inputs 129 may also be employed. Accordingly, in any embodiment described herein, two or more power inputs 129 and AC power converters 133 may be used, where any power input 129 and AC power converter 133 in addition to two provides greater power source redundancy as can be appreciated.

Each of the power sources 123 may be configured to supply power to multiple PST devices 126 as shown. Alternatively, in the various embodiments described herein, the single PST device 126 may be viewed as representing multiple parallel PST devices 126 that each couple to one of the power inputs 129. In some implementations, an AC power source 123 may be the primary supply for one or more PST device(s) 126 and the backup supply for other PST device(s) 126. The PST devices 126 may be assigned to balance loading of the power sources 123 during normal and backup operation.

In a PST device 126, a first AC power converter 133 acts as a primary supply to the common DC bus 136, while the other AC power converter(s) 133 acts as a backup supply. For example, in the embodiment of FIG. 1, one AC power converter 133 is the primary supply that provides all DC power while the other backup AC power converter 133 remains idle. While idle, the backup AC power converter 133 may not provide any power to the common DC bus 136. In other implementations, the backup AC power converter 133 may provide a minimal amount of power when idle to reduce transient heating effects during load transfer to the backup AC power converter 133. When the primary supply fails (e.g., upon loss of the corresponding AC power source 123 or failure of the primary AC power converter 133), the backup AC power converter 133 assumes the system load by providing power to the common DC bus 136. As can be understood, a power source 123 may include two or more backup AC power converters 133 to provide additional redundancy for the computing device 100.

In some embodiments, a plurality of AC power converters 133 (e.g., P+B converters 133, where P>1 and B≥1) including a first group of AC power converters 133 (e.g., the P converters 133) and a second group of AC power converters 133 (e.g., the remaining B converters 133) may be used. The first group of AC power converters 133 are primary AC power converters 133 that together supply sufficient power to the common DC bus 136 to supply the system load. The primary AC power converters 133 may receive power from a combination of one or more AC power source(s) 123. For example, two or more primary AC power converters 133 may receive power from the same AC power source 123 or each AC power converter 133 may receive power from a different AC power source 123. The AC power converters 133 of the second group are configured to supply backup power in the case of one or more primary AC power converters 133. The number of backup AC power converters in the second group may be chosen to be the number of failures that the system is designed to tolerate. In this way, the total number (P+B) of AC power converters 133 in the plurality of AC power converters may be less than 2×P (i.e., B<P).

With reference to FIG. 2, shown is an example of the PST device 126 of FIG. 1. In the embodiment of FIG. 2, the PST device 126 includes a primary AC power converter 133a configured to provide power to the common DC bus 136 at a first voltage level and a backup AC power converter 133b configured to provide power to the common DC bus 136 at a second voltage level that is less than the first voltage level. The AC power converters 133a and 133b may be of identical design such that the output voltages are determined by random variations in the components of the AC power converters 133a and 133b. The variation of the output voltages may be used to determine which power converters are the primary AC power converter 133a and the backup AC power converter 133b. For example, internal voltage references and/or internal current limiting circuits may be used to control the output voltage, such that when a particular AC power converter 133 supplies a particular voltage at a particular current (both determined by the random internal part variations) the internal limiting circuits causes the output voltage to droop to limit the current supplied by the AC power converter 133. While providing balancing between multiple primary AC power converters 133a, this voltage control also avows one or more backup AC power converter(s) 133b with lower voltage references to smoothly pick up the load during a failure. In this way any number of converters can be connected together without any outside control mechanism. A diode 263 may be included between the backup AC power converter 133b and the common DC bus 136. During operation, the primary AC power converter 133a supplies power to one or more computing device(s) 100 (FIG. 1) via the common DC bus 136 and the DC power converter 139 and/or the DC power interface 143. Because the backup AC power converter 133b operates at a lower voltage level, no power is provided by the backup converter 133b. The reverse biased diode 263 prevents the flow of current into the backup AC power converter 133b.

When the voltage level of the primary AC power converter 133a, and thus the common DC bus 136, falls below the second voltage level of the backup AC power converter 133b (e.g., when the primary AC power converter 133a or the corresponding AC power source 123 of FIG. 1 fails), the diode 263 is forward biased and backup AC power converter 133b supplies power to the computing device(s) 100 via the common DC bus 136 and the DC power converter 139 and/or the DC power interface 143. The implementation of FIG. 2 allows for a smooth transition of load from the primary AC power converter 133a to the backup AC power converter 133b. Reactive elements such as inductors and capacitors may be included in the AC power converters 133 and/or on the common DC bus 136 to reduce transient effects such as current spikes and voltage dips. When the power from the primary AC power converter 133a is restored, the diode 263 is again reverse biased and the backup AC power converter 133b returns to an idle state.

A second diode 266 may also be connected between the primary AC power converter 133a and the common DC bus 136 as illustrated in FIG. 2. When the primary AC power converter 133a is supplying power to the common DC bus 136, the second diode 266 is forward biased. When the voltage level of the primary AC power converter 133a falls below the second voltage level of the backup AC power converter 133b (e.g., during failure of the AC power source 123), the diode 266 becomes reverse biased and prevents the flow of current into the primary AC power converter 133a. When the power from the primary AC power converter 133a is restored, the diode 266 is forward biased to supply power to the common DC bus 136 and the backup AC power converter 133b returns to an idle state.

In other embodiments, an isolation device (e.g., a switch, relay, or transistor) may be opened to disconnect and isolate the output of the primary AC power converter 133a from the common DC bus when the voltage drops below a predefined level or threshold. The isolation device may automatically reclose when the voltage level is restored to above the same or another predefined level or threshold. In some implementations, the isolation device may use a manual reset to allow reclosing.

Referring next to FIG. 3, some embodiments of the PST device 126 include at least one processor circuit, for example, having a processor 303 and a memory 306, both of which are coupled to a local interface. The PST device 126 may also include communication interfaces for interactions with other PST devices 126, computing devices 100, or management systems. The PST device 126 may also include a power transfer monitoring (PTM) application 309 stored in the memory 306. When implemented by the processor 303, the PTM application 309 monitors operation of the PST device 126 such as, but not limited to, power output, voltage levels and/or rates of change. The PTM application 309 may also control operation of the AC power converters 133 as will be discussed.

In the example of FIG. 3, a primary AC power converter 133 supplies the common DC bus 136 at a first voltage level to provide power to the computing device(s) 100 through the DC power converter 139 and/or the DC power interface 143. The first voltage level may be set by the circuitry of the primary AC power converter 133 or may be controlled by the PTM application 309. For example, the voltage may be set by the switching interval of the primary AC power converter 133. The switching interval may be fixed to provide a predefined voltage level or may be variable to allow for adjustment of the voltage level. Internal voltage references and/or internal current limiting circuits may also be used to control the output voltage, such that when a particular AC power converter 133 supplies a particular voltage at a particular current the internal limiting circuits causes the output voltage to droop to limit the current supplied by the AC power converter 133. The voltage droop can provide load balancing between multiple primary AC power converters 133, as well as allowing for a smooth load transition to one or more backup AC power converter(s) 133 during a failure. Reactive elements may be included in the primary AC power converter 133 to smooth out variations in the supplied DC power. For example, a capacitor may be included to reduce voltage variations on the common DC bus 136, and an inductor may be included to reduce high rates of change in the supply current.

If the output voltage of the primary AC power converter 133 on the common DC bus 136 begins to drop, the circuitry of the primary AC power converter 133 and/or the PTM application 309 may automatically adjust the switching interval in an attempt to maintain the first voltage level. If the output voltage of the primary AC power converter 133 falls below a second predefined voltage level or threshold, then the backup AC power converter 133 begins providing power to the common DC bus 136. Reactive elements may be included in the backup AC power converter 133 to smooth out variations in the supplied DC power.

According to various embodiments, the PTM application 309 may monitor the rate of change in the voltage level of the common DC bus 136 and/or the voltage and/or power output of the primary AC power converter 133. A rapid change in the voltage level may indicate excessive loading of the primary AC converter 133 or a failure of the primary AC converter 133 and/or the corresponding AC power source 123 (FIG. 1). If the rate of change in the voltage exceeds a predefined value or threshold, then the backup AC power converter 133 begins providing power to the common DC bus 136.

In some embodiments, the PTM application 309 may monitor the DC power output by the primary AC power converter 133 to the common DC bus 136 to determine if transfer should occur based upon the loading of the PST device 126. If the output power of the primary AC power converter 133 falls below a predefined power level or threshold associated with the computing device load of the PST device 126, then the PTM application 309 may cause the backup AC power converter 133 to begin providing power to the common DC bus 136. The DC power output by the backup AC power converter 133 may also be monitored by the PTM application 309 after it begins providing power.

In some implementations, the primary AC power converter 133 supplies all of the power to the PST device 126 while the backup AC power converter 133 remains idle without supplying any power. In other embodiments, the backup AC power converter 133 may provide a minimal amount of power when idle to reduce transient heating effects during load transfer to the backup AC power converter 133. In response to breaching the threshold (e.g., the predefined voltage or power threshold), the backup AC power converter 133 may assume the entire load while the primary AC power converter 133 becomes idle without supplying any power to the common DC bus 136. Alternatively, the backup AC power converter 133 may assume a portion of the load and the PTM application 309 may control load sharing between the primary and backup converters 133.

Embodiments of the present disclosure may also include combinations of elements of FIGS. 1-3. For example, the embodiment of FIG. 3 may also include a diode (e.g., diode 263 of FIG. 2) between the backup AC power converter 133 and the common DC bus 136 as illustrated in FIG. 2. Another diode and/or isolation device may also be included between the primary AC power converter 133 and the common DC bus 136.

Figure 4:
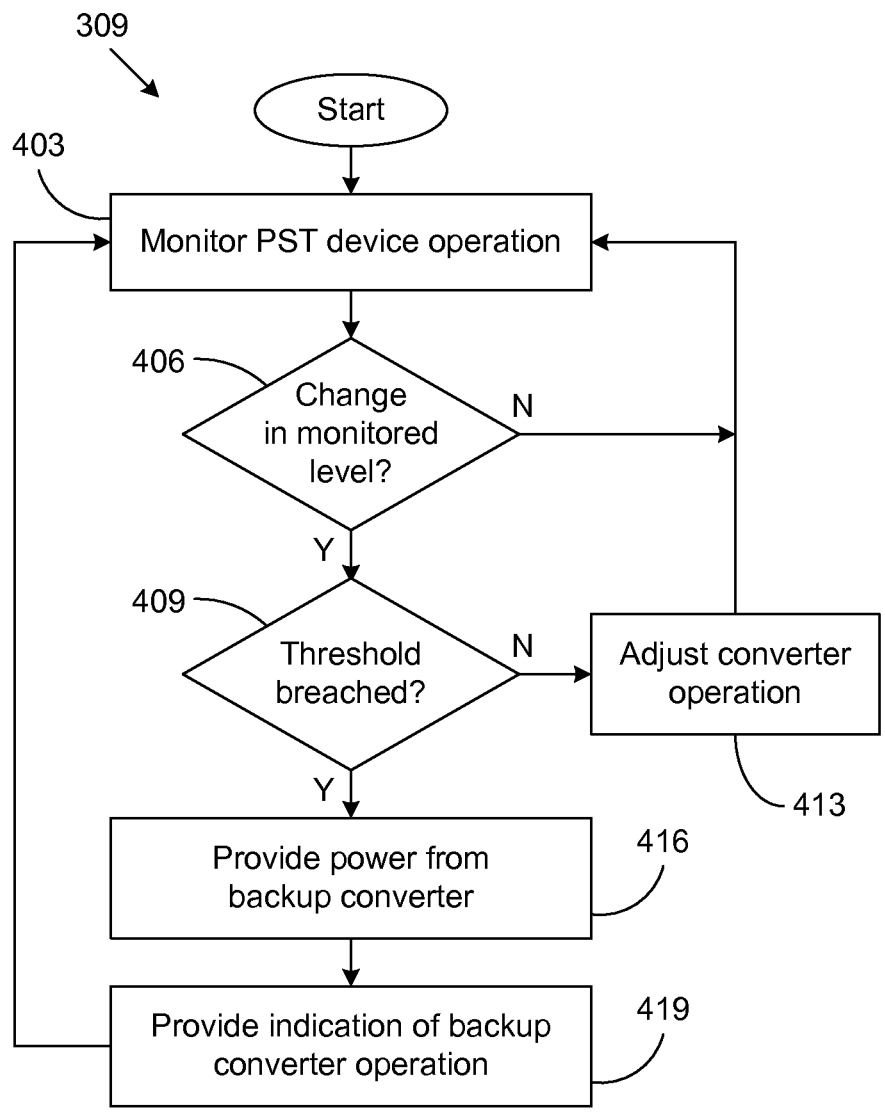
FIG. 4 is a flowchart illustrating one example of functionality of a power transfer monitoring (PTM) application implemented in the PST device of FIG. 3 according to various embodiments of the present disclosure.

Referring now to FIG. 4, shown is a flowchart illustrating one example of functionality of a power transfer monitoring (PTM) application 309 implemented by the processor 303 of FIG. 3 according to various embodiments of the present disclosure. It is understood that the flowchart of FIG. 4 provides merely an example of the many different types of functional arrangements that may be employed to implement the operation of the portion of the PTM application 309 as described herein. As an alternative, the flowchart of FIG. 4 may be viewed as depicting an example of steps of a method implemented in the PST device 126 (FIGS. 1-3) according to one or more embodiments.

Beginning with block 403, operation of the PST device 126 is monitored. The PTM application 309 may monitor the rate of change in the voltage level of the common DC bus 136 (FIGS. 1-3) and/or the voltage level of the primary AC power converter 133 (FIGS. 1-3). In other implementations, the PTM application 309 may monitor the power output of the primary AC power converter 133. If no change in the monitored level is detected in block 406, then the PTM application 309 continues monitoring operation of the PST device 126 in block 403. If a change is detected, then the PTM application 309 compares the monitored level to a threshold in block 409. For example, the voltage level of the common DC bus 136 and/or of the primary AC power converter 133 may be compared to a corresponding threshold. Alternatively, the rate of change of the voltage level may be compared to a threshold. In other implementations, the DC output power of the primary AC power converter 133 may be compared to a threshold associated with the loading of the PST device 126.

If the threshold is not breached, then the PTM application 309 may modify the operation of the primary AC power converter 133 in block 413 and return to monitoring the power supply operation in block 403. For example, the operation of the primary AC power converter 133 may change to adjust the current voltage level of the common DC bus 136. In some embodiments, the PTM application 309 may provide current limiting that causes the output voltage to droop to limit the current supplied by the AC power converter 133. This voltage control can provide load balancing between multiple primary AC power converters 133. If the threshold has been breached, then the PTM application 309 provides power from a backup AC power converter 133 in block 416. The PTM application 309 may control the backup AC power converter 133 to provide all or a portion of the power for the PST device 126 while reducing or minimizing the transition effects such as current and/or voltage spikes. For example, the PTM application 309 may provide current limiting of one or more backup AC power converter(s) 133 to allow for a smooth pick up of the load by the backup AC power converter(s) 133 during a failure. The PTM application 309 may then return to monitoring operation of the PST device 126 in block 403.

The PTM application 309 may also provide an indication of the operation of the backup AC power converter 133 in block 419 before returning to monitoring the PST device 126 operation. Indications may include, for example, an audible alarm (e.g., using a speaker), a visual alarm (e.g., using a light indicator), a messaging alarm (e.g., an email, text message, or other type of message), a flag (e.g., a software variable indicating an alarm condition to a monitoring system), or other type of alarm. For example, the PTM application 309 may communicate an indication of backup AC power converter 133 operation to a power management application of a management system. The power management application may then inform system operators of the operation of the backup AC power converter 133 for appropriate action or may initiate actions in response to the indication. Indications from multiple PST devices 126 may aid in fault isolation and restoration of power sources 123.

Where any component discussed herein such as the PTM application 309 is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components may be stored in the memories 106, 306 and are executable by the respective processors 103, 303. In this respect, the term "executable" means a program file that is in a form that can ultimately be run by a respective one of the processors 103, 303. Examples of executable programs may be, for example, a compiled program that can be translated into machine code in a format that can be loaded into a random access portion of a respective one of the memories 106, 306 and run by a respective one of the processors 103, 303, source code that may be expressed in proper format such as object code that is capable of being loaded into a random access portion of a respective one of the memories 106, 306 and executed by a respective one of the processors 103, 303, or source code that may be interpreted by another executable program to generate instructions in a random access portion of a respective one of the memories 106, 306 to be executed by the respective processor 103, 303, etc. An executable program may be stored in any portion or component of a memory 106, 306 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Each of the memories 106, 306 is defined herein as including both volatile and nonvolatile memory and data storage components. Volatile components are those that do not retain data values upon loss of power. Nonvolatile components are those that retain data upon a loss of power. Thus, each of the memories 106, 306 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, each of the processors 103, 303 may represent multiple processors and the memories 106, 306 may represent multiple memories that operate in parallel processing circuits, respectively. In such a case, each of the local interfaces 109 may comprise an appropriate network that facilitates communication between any two of the multiple processors between any processor and any of the memories, or between any two of the memories, etc. Each of the local interfaces 109 may comprise additional systems designed to coordinate this communication, including, for example, performing load balancing. Each processor 103, 303 may be of electrical or of some other available construction.

Although the PTM application 309 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 4 shows the functionality and operation of an implementation of various embodiments of the PTM application 309 as described above. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 103, 303 in a computer system or other system. The machine code may be converted from the source code, etc. If embodied in hardware, each block may represent a circuit or a number of interconnected circuits to implement the specified logical function(s).

Although the flowchart of FIG. 4 shows a specific order of execution, it is understood that the order of execution may differ from that which is depicted. For example, the order of execution of two or more blocks may be scrambled relative to the order shown. Also, two or more blocks shown in succession in FIG. 4 may be executed concurrently or with partial concurrence. Further, in some embodiments, one or more of the blocks shown in FIG. 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the PTM application 309, that comprises software or code can be embodied in any non-transitory computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

While the embodiments of FIGS. 1-4 are discussed with respect to a single backup AC power converter 133, a plurality of backup power converters 133 may also be utilized. Each of the backup AC power converters 133 may be configured to operate at a corresponding voltage level or may be controlled by the PTM application 309 to provide power to the common DC bus 136 as appropriate. The PTM application 309 may also control the backup AC power converters 133 to share the load of the PST device 126.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A power source transfer apparatus, comprising:
a common DC bus;
a primary AC power converter configured to receive AC power from a first AC power source and to provide DC power to the common DC bus at a first voltage level;
a backup AC power converter configured to receive AC power from a second AC power source, the backup AC power converter configured to provide a baseline amount of DC power while the backup AC power converter is idle when the DC power supplied by the primary AC power converter is above a second voltage level, where the baseline amount of DC power mitigates transient heating effects that occur during load transfer to the backup AC power converter, the backup AC power converter further configured to provide additional DC power to the common DC bus at the second voltage level when the DC power supplied by the primary AC power converter drops below the second voltage level;
- a DC power converter configured to receive DC power from the common DC bus and to provide AC power to at least one of a plurality of computing devices; and
- a DC power interface configured to provide DC power from the common DC bus to at least another one of the plurality of computing devices.

2. The power source transfer apparatus of claim 1, wherein the power source transfer apparatus further comprises a diode coupled between an output of the primary AC power converter and the common DC bus.

3. The power source transfer apparatus of claim 1, wherein the DC power converter provides AC power to the at least one computing device through an AC distribution network comprising a first network of rails or buses and the DC power interface provides DC power to the at least another computing device of the plurality of computing devices through a DC distribution network comprising a second network of rails or buses.

4. The power source transfer apparatus of claim 1, wherein the primary AC power converter and the backup AC power converter are configured to correct a power factor seen by the first and second AC power source.

5. A power source transfer apparatus, comprising:
- a common DC bus;
- a primary AC power converter configured to receive AC power from a first AC power source and to provide DC power to the common DC bus; and
- a backup AC power converter configured to receive AC power from a second AC power source, the backup AC power converter further configured to provide DC power to the common DC bus; and
- a power transfer monitoring (PTM) application that, when executed by processor circuitry in the power source transfer apparatus, controls the provision of power to the common DC bus by the backup AC power converter in response to a change in a monitored level provided by the primary AC power converter, where a baseline amount of DC power is provided by the backup AC power converter when the backup AC power converter is idle while the monitored level provided by the primary AC converter is above a predefined threshold and additional DC power is provided by the backup AC power converter when the monitored level provided by the primary AC converter drops below the predefined threshold, where the baseline amount of DC power prevents transient heating effects that occur during load transfer to the backup AC power converter.

6. The power source transfer apparatus of claim 5, wherein an isolation device is configured to physically disconnect and isolate the primary AC power converter in response to the change in the monitored level provided by the primary AC power converter.

7. The power source transfer apparatus of claim 5, wherein the processor circuitry comprises:

memory storing the PTM application; and
a processor configured to execute the PTM application.

8. The power source transfer apparatus of claim 5, further comprising a DC converter configured to receive DC power from the common DC bus and to provide AC power to a computing device.

9. The power source transfer apparatus of claim 5, further comprising a DC interface configured to provide DC power from the common DC bus to a computing device.

10. The power source transfer apparatus of claim 5, wherein the monitored level is a monitored voltage level provided by the primary AC power converter to the common DC bus.

11. The power source transfer apparatus of claim 10, wherein the backup AC power converter provides additional DC power to the common DC bus when a rate of change of the monitored voltage level provided by the primary AC power converter exceeds a predefined voltage rate threshold.

12. The power source transfer apparatus of claim 5, wherein the monitored level is a monitored level of DC power supplied by the primary AC power converter to the common DC bus.

13. The power source transfer apparatus of claim 12, wherein the backup AC power converter provides additional DC power to the common DC bus when a rate of change in the monitored level of DC power provided by the primary AC power converter breaches a predefined power rate threshold.

14. A power source transfer system, comprising:
- a plurality of AC power sources;
- a plurality of computing devices; and
- a power source transfer (PST) device configured to supply power to the plurality of computing devices, the PST device comprising:
  - a common DC bus;
  - a first AC power converter configured to receive power from a first one of the plurality of AC power sources and to provide DC power to the common DC bus; and
  - a second AC power converter configured to receive power from a second one of the plurality of AC power sources, the second AC power converter further configured to provide DC power to the common DC bus in response to a change in a monitored level provided by the first AC power converter, where a baseline amount of DC power is provided by the second AC power converter when the second AC power converter is idle while the monitored level provided by the first AC power converter is above a predefined threshold and additional DC power is provided by the second AC power converter when the monitored level provided by the first AC power converter drops below the predefined threshold, where the baseline amount of DC power mitigates transient heating effects that occur during load transfer to the backup AC power converter.

15. The power source transfer system of claim 14, further comprising:
- a DC converter configured to receive DC power from the common DC bus and to provide AC power to at least one of the plurality of computing devices.

16. The power source transfer system of claim 14, further comprising:
- a DC interface configured to provide DC power from the common DC bus to at least one of the plurality of computing devices.

17. The power source transfer system of claim 14, wherein the PST device supplies power to the plurality of computing devices through a distribution network.

18. The power source transfer system of claim 17, wherein the plurality of computing devices are mounted in a mounting rack including at least a portion of the distribution network.

19. The power source transfer system of claim 14, wherein the PST device further comprises a power transfer monitoring (PTM) application that, when executed by processor circuitry in the PST device, controls the provision of power to the common DC bus by the second AC power converter in response to the change in the monitored level provided by the first AC power converter.

20. The power source transfer system of claim 19, wherein the monitored level is a monitored level of DC power provided by the first AC power converter.

21. The power source transfer system of claim 20, wherein the second AC power converter provides additional DC power to the common DC bus when a rate of change of the monitored level of DC power breaches a predefined power rate threshold.

22. The power source transfer system of claim 14, wherein the monitored level is a monitored voltage level provided by the first AC power converter.

* * * * *